United States Patent [19]

Tuckey

[11] Patent Number: 4,540,354
[45] Date of Patent: Sep. 10, 1985

[54] ROTARY FUEL PUMP

[75] Inventor: Charles H. Tuckey, Cass City, Mich.

[73] Assignee: Walbro Corporation, Cass City, Mich.

[21] Appl. No.: 557,468

[22] Filed: Dec. 5, 1983

Related U.S. Application Data

[63] Continuation-in-part of Ser. No. 403,097, Jul. 29, 1982.

[51] Int. Cl.³ .......... F04C 2/10; F04C 15/02; F16K 15/14; F16K 21/04
[52] U.S. Cl. .................. 418/15; 418/135; 418/157; 418/171; 137/512.15; 137/854; 417/440
[58] Field of Search .............. 418/15, 157, 166, 170, 418/171, 270, 189, 135; 137/512.15, 516.15, 834; 417/310, 440

[56] References Cited

U.S. PATENT DOCUMENTS

| | | | |
|---|---|---|---|
| 2,380,783 | 7/1945 | Painter | 417/310 |
| 2,383,153 | 8/1945 | Parsons | 417/440 X |
| 2,405,061 | 7/1946 | Shaw | 418/171 X |
| 2,569,717 | 10/1951 | Holl | 417/315 |
| 2,629,540 | 2/1953 | Beck | 137/512.15 |
| 2,670,688 | 3/1954 | Graham | 418/189 X |
| 2,787,963 | 4/1957 | Dolan et al. | 418/135 X |
| 2,912,937 | 11/1959 | Insley | 418/15 X |
| 3,170,409 | 2/1965 | McLeod et al. | 418/171 |
| 3,198,127 | 8/1965 | Brundage | 418/135 X |
| 4,315,719 | 2/1982 | Sakamaki et al. | 137/854 X |
| 4,443,169 | 4/1984 | Merz | 418/15 X |
| 4,447,192 | 5/1984 | Tuckey | 417/366 X |

FOREIGN PATENT DOCUMENTS

| | | | |
|---|---|---|---|
| 0083491 | 7/1983 | European Pat. Off. | 418/135 |
| 3015942 | 10/1981 | Fed. Rep. of Germany | 418/170 |
| 0580895 | 9/1946 | United Kingdom | 418/135 |

*Primary Examiner*—John J. Vrablik
*Assistant Examiner*—Theodore W. Olds
*Attorney, Agent, or Firm*—Barnes, Kisselle, Raisch, Choate, Whittemore & Hulbert

[57] ABSTRACT

A rotary pump for pumping liquid which includes a rotor combination in the form of a vane pump or gear and rotor with pumping chambers disposed circumferentially around the rotor. The chambers progressively increase in the inlet area and ensmall in the outlet area. Resilient means are interposed between the ensmalling chambers and an outlet to block backflow of the pressurized outlet liquid into pumping chambers containing vaporized liquid instead of solid liquid, thus reducing the pump noise under conditions of vaporization termed "cavitation".

3 Claims, 10 Drawing Figures

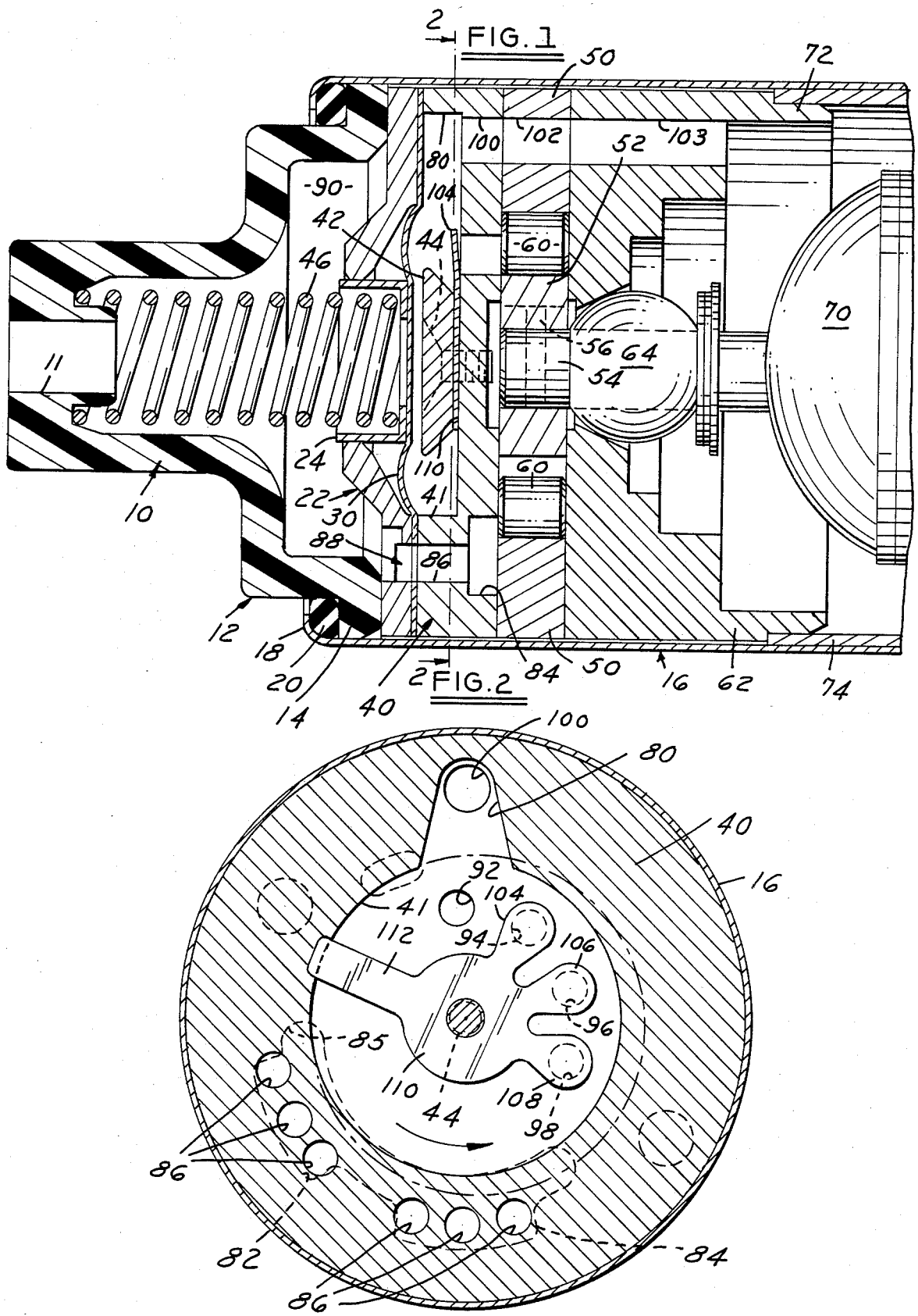

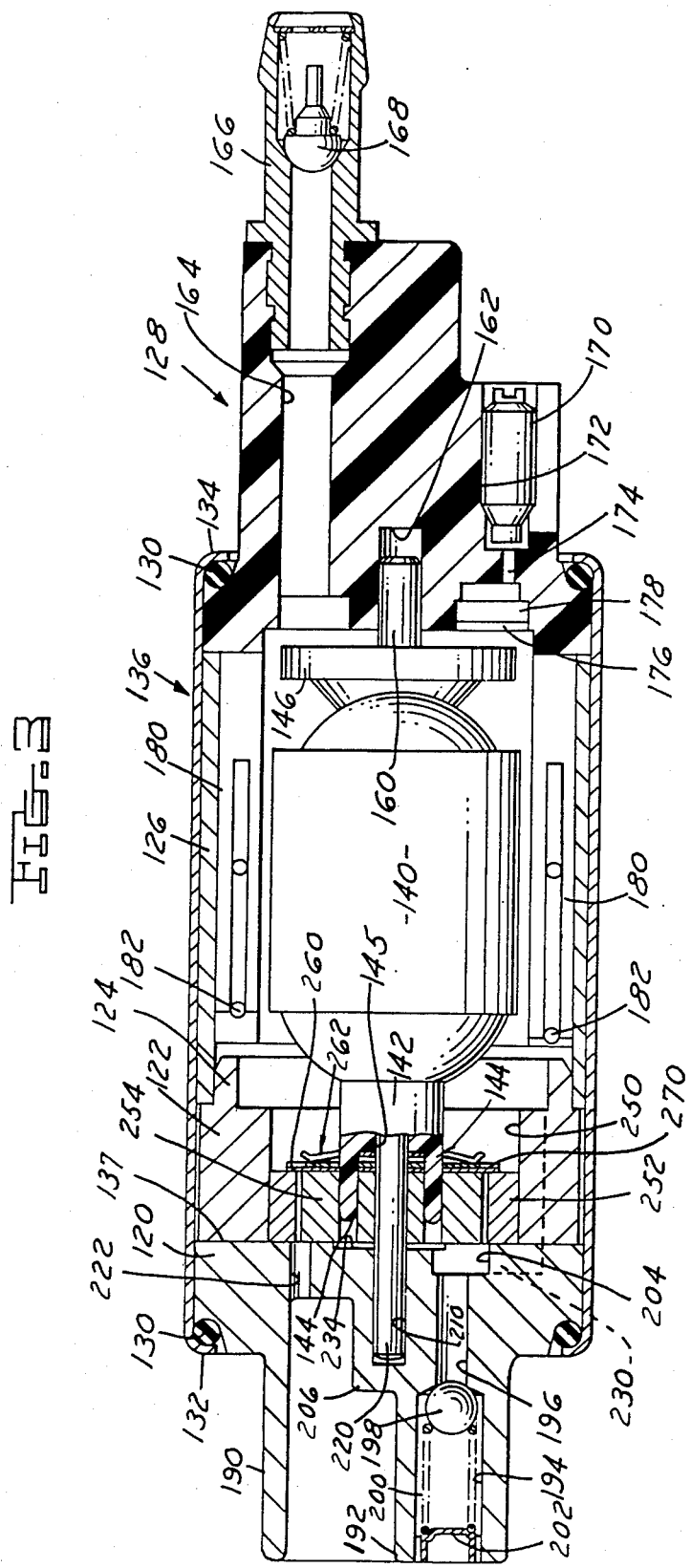

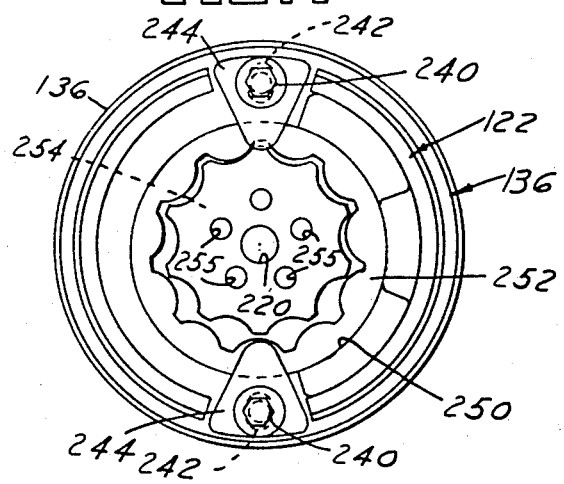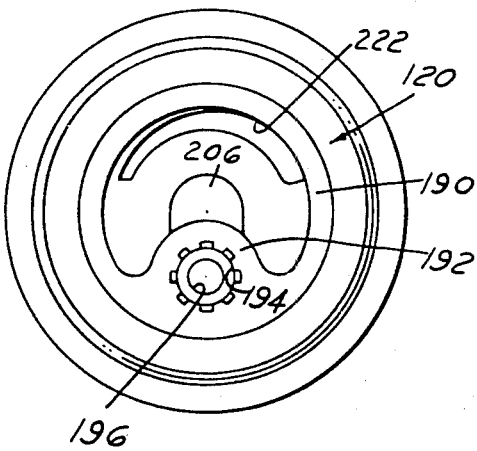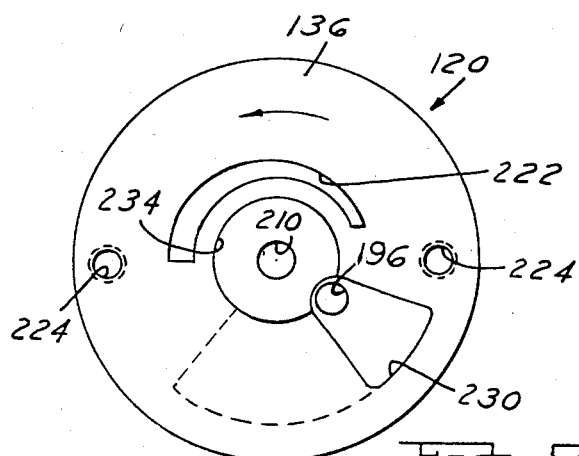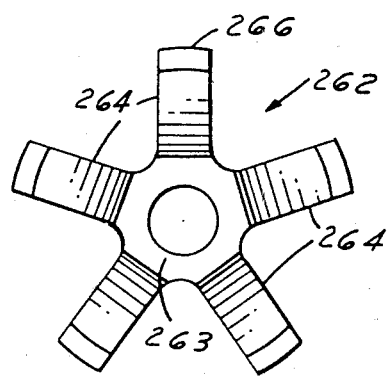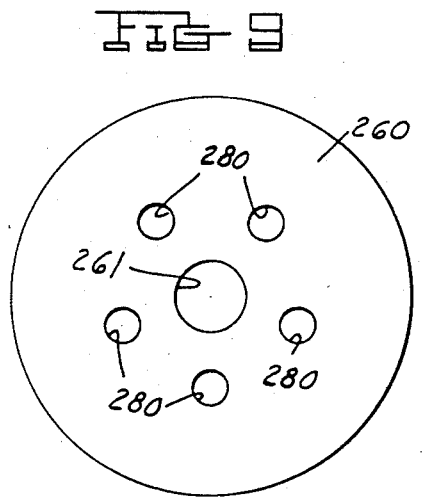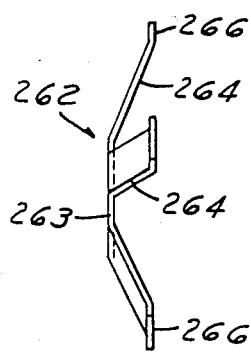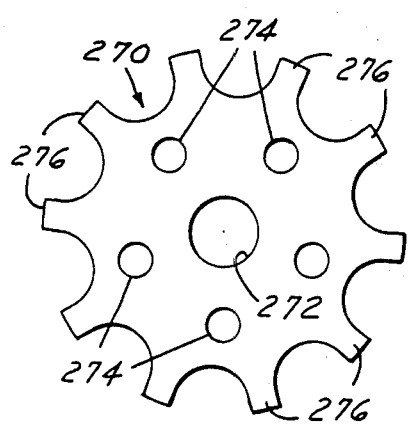

ROTARY FUEL PUMP

Reference is made to my copending U.S. application, Ser. No. 403,097, filed July 29, 1982, of which this application is a continuation-in-part.

FIELD OF INVENTION

Electric fuel pumps utilizing a rotary pump and electric drive housed together for mounting on a vehicle or in a vehicle fuel tank.

BACKGROUND OF THE INVENTION

Rotary fuel pumps driven by an electrical powering device have been utilized for some years in vehicles either as original equipment or as appliances to supplement the original fuel supply system. The pump and power unit are frequently in a common housing as shown, for example, in U.S. Pat. No. 4,352,641, issued Oct. 5, 1982, to Charles H. Tuckey.

Since the pumps are frequently mounted in the fuel tanks of a vehicle, the noise factor is extremely important. A pump under load will normally produce more noise and this may be audible as a humming noise, to an annoying degree, to passengers in the vehicle. Various pulse dampening devices have been tried with some success but since they usually involve material such as a closed cell foam material or a hollow pulse dampening chamber of a synthetic flexible material, the useful life of these devices is limited by the vulnerability of the material in the presence of hydrocarbons.

Normally, during operation of these pumps, the media being pumped is in a liquid state and noise is at a minimum level. As the pumping cells are filled during the intake portion of the cycle, there are no voids, that is, no vapor in the pumping chamber when the exhaust ports are opened. If, however, a void or vapor is present (cavitation) in the pumping chamber when the exhaust port is opened, the pressure on the outlet side of the port can force fluid back through the exhaust port in a reverse direction into the pumping chamber to fill the void.

Since fuel in the outlet side of the exhaust port is normally at an operating pressure of, for example, 15 to 80 pounds per square inch, any reversal of flow through the exhaust port would be a very high velocity causing an impact noise. With a relatively standard rotation pump, this sequence can occur five times per revolution of the pumping rotor and at high speed can become very audible.

It is an object of the present invention to provide a pump construction which will avoid the reverse flow impact during cavitation and consequently materially reduce the noise of the pump operation under these circumstances.

It will be appreciated that in the pumping cycle as one pumping cell is exhausting, another cell is taking in fluid at the same time. In other words, intake and exhaust pressure waves are timed with one another, and normally the quantity of fluid being exhausted from each cell is the same as that being taken in by another cell.

The principle of the present invention lies in the elimination of the reversal of fluid flow through the exhaust port.

Another object of the invention is the interposition of a flexing device over the exhaust port adjacent the rotor to allow the escape of fluid under pressure but to prevent fluid under pressure from impacting back into the pumping chamber under cavitation conditions, namely, vapor conditions.

A further concept of the invention involves dividing the exhaust port area into several openings with a one-way valve at the discharge side of each port opening. This will allow liquid fuel under pressure to flow out and at the same time prevent any fluid pressure from backing up into the pumping chamber during a vapor or cavitation condition.

Other objects and features of the invention will be apparent in the following description and claims in which the principles of the invention are set forth together with details to enable a person skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 1, a longitudinal section of a rotating, electrically driven pump.

FIG. 2, a transverse sectional view on line 2—2 of FIG. 1.

FIG. 3, a longitudinal section of a modified pump construction.

FIG. 4, an interior view of the inlet end of the pump and the pump assembly.

FIG. 5, a view of the pump inlet end from the outside.

FIG. 6, a view of the pump inlet end from the inside without the pump elements.

FIG. 7, an elevation of a spring.

FIG. 8, side view of the spring retainer.

FIG. 9, an elevation view of the gear pump seal plate.

FIG. 10, a view of a finger plate for edge reinforcement of a seal plate.

DETAILED DESCRIPTION OF THE INVENTION AND THE MANNER AND PROCESS OF USING IT

With respect to a proper disclosure, reference is made to my copending application, U.S. Ser. No. 403,097, filed July 29, 1982, and U.S. Pat. No. 4,352,641, issued Oct. 5, 1982. In FIG. 1, the inlet end of a rotary pump is illustrated wherein an end cap 10 has a nipple inlet port 11 and an outwardly extending annular flange 12 with an annular rim 14 captured in a shell 16 with an inturned flange 18. A sealing O-ring 20 is interposed between flanges 14 and 18.

Inside of the flange 14 is a retainer plate 22 for a pulse dampener diaphragm which carries a spring retainer cup 24. A pulse modulation diaphragm 30 lies inside the retainer plate 22, the annular edge being captured and retained between the periphery of plate 22 and the periphery of a pump end plate 40. Within a surface recess 41 in the plate 40 is a reed valve retainer disc 42 retained by a recessed screw 44. A dampener spring 46 bears at one end against the end cap 10 in an annular groove and at the other end is lodged in the cup 24. The bottom of the cup bears against the central area of the diaphragm 30.

The reed valve retainer disc 42 has a flat surface which can serve as a stop for the central portion of the diaphragm 30 and the bottom of cup 24.

Adjacent the pump end plate 40 is a pump cam ring 50 which houses a pump rotor 52 mounted on a motor armature drive shaft 54 with a pin 56 providing the driving relationship.

The rotor 52 has radial slots to receive pump roller vanes 60. A bearing retainer housing and back-up plate 62 adjacent the pump cam ring 50 has a central opening to receive an armature shaft bearing 64 on the armature shaft 54 which extends from the armature assembly 70. The housing 62 has a rearwardly extending flange 72 with an annular recess to receive the end of a flux ring 74. The discharge end of the pump is not shown but is described in the above-referenced application and patent. The back-up plate 62 bears against the pump rotor combination and closes the pumping chambers on one side of that combination.

With reference to the pump end plate 40, the recess 41 is illustrated in profile in FIG. 2. This recess is enlarged at the top of the figure in a recess 80. At the bottom of the plate at the side opposite recess 41 there are two lobe-like spaced recesses 82 and 84 connected by an arcuate port 85 which extend downwardly and are open to ports 86 perforating the plate to the inlet end. These ports register with openings 88 in the inlet plate 22 and diaphragm 30. Openings 88 extend to an annular inlet chamber 90 open to the port 11.

In FIG. 2, four exhaust ports 92, 94, 96 and 98 perforate the plate 40 into the recess 41. At the top of FIGS. 1 and 2, a port 100 connects the recess 80 to a through passage 102 in plate 50 leading to a passage 103 in housing 62 opening to the armature chamber surrounding the armature assembly 70.

As viewed in FIG. 2, a multi-fingered reed valve in the form of a thin flexible sheet has fingers 104, 106 and 108 overlying exhaust ports 94, 96 and 98. These fingers extend from a central palm portion 110 clamped to the pump end plate 40 by the flat retainer 42. A tab 112 extends from the palm portion 110 in a direction essentially opposite to the fingers to lodge in a recess and serve as a locator for the reed valve. It is not necessary that port 92 be covered by a resilient finger since by the time the compressive chambers reach this port, any vapor will be reduced to a liqud.

IN THE OPERATION of the pump when the armature is rotating and driving the pump rotor 52 within the cam ring 50, the roller vanes 60 create a sub-atmospheric condition in the inlet lobes 82, 84, and inlet fluid, for example, liquid gasoline, enters port 11 from a tank supply and flows into annular recess 90 and through opening 88 to passages 86 leading to the lobe-like recesses 82 and 84 and the connecting arcuate port 85 which is located at the periphery of the pump rotor 52. The liquid enters the radial slots of the pump rotor and is carried around to the exhaust ports 92, 94, 96 and 98. As the vane openings are ensmalled by the cam ring, the pressure of the fluid is increased and forced out of the exhaust ports into the recesses 41 and 80. Under normal circumstances, the fuel is forced past the reed valves or fingers 104, 106, 108 and will exit through the passages 100, 102 and 103 on the way to the outlet.

"Cavitation" is a term applied to a condition in pumping wherein the fluid being pumped turns to a vapor. With volatile fuels, this is frequently a problem especially in hot weather. As previously indicated, if an outlet pressure has developed in the outlet passage and a pumping chamber in the rotor reaches the outlet (exhaust) ports of the pump carrying, not solid fuel, but vapor, the liquid in the outlet passages tends to move back into the vacant pump chamber. This causes a reverse flow impact which creates noise in the pump.

To avoid this reverse flow impact, the reed valve fingers overlie the exhaust or outlet ports of the pump and block any tendency of the outlet pressure to move back into a vapor filled pump chamber. In this embodiment the exhaust ports have been divided from a single arcuate port into individual ports which can be controlled individually.

Another feature of the disclosed pump which contributes to a steady even flow lies in the flexible diaphragm 30 backed by the spring 46. Pressure in the outlet chamber 41 will act against the diaphragm and spring and these resilient elements will absorb pulses and smooth out the output flow.

A second embodiment of the invention is illustrated in FIGS. 3 to 10. This embodiment is illustrated and described in my copending application, Ser. No. 403,097, filed July 29, 1982.

With reference first to FIG. 3, the general assembly of the gear rotor pump is shown in a longitudinal section. An inlet end shell or housing 120, which can be a die casting or molded part, butts against a cam ring 122 which has a reduced flange 124 telescoping into one end of a flux ring 126. At the other end of the flux ring is an outlet end part 128. The inlet end and the outlet end each have opposed shoulders against which sealing rings 130 are disposed, held in place by spun-in ends 132, 134 of an outer metallic shell 136. The inlet housing 120 has a flat inner surface 137 which serves as one wall of a pump rotor housing.

In FIG. 3, an armature assembly 140 is illustrated having a cylindrical drive projection 142 at one end with slender projecting fingers 144 circumferentially spaced around projection 142. At the other end of assembly 140 is a commutator disc 146.

The armature shaft 160 at the commutator end is received in a central recess 162 in the end housing. Reverting to FIG. 3, the outlet end housing 128 has an axially extending passage 164 which serves as a pump outlet in conjunction with a brass outlet fitting 166 carrying a one-way, spring-pressed outlet valve 168. This fitting is molded into the outlet housing 128 formed of a glass reinforced plastic which has a high degree of resistance to hydrocarbons, as do the other plastic parts of the assembly. A screw outlet bleed adjustment plug 170 is threaded into recess 172 in end housing 128 to control a passage 174 leading to the interior of the pump assembly. A filter disc 176 is positioned in a port 178 connecting to passage 174.

The end housing 128 has axially extending split fingers 180 carrying spreading springs 182. See FIG. 3. These fingers hold semi-circular permanent magnets which surround the armature outside an air gap and form the motor field.

The inlet end 120 of the pump at the left end of FIG. 3 has a cylindrical entrance collar 190. Viewed from the outer end, as in FIG. 5, this collar has an internal bulge 192 toward the center. The bulge has an axial recess 194 splined on its inner surface and leads to a passage 196 ensmalled to form a valve seat for a ball valve 198 backed by a spring 200 retained by a press-fit button 202. Passage 196 communicates with a pump outlet passage 204 so that the ball valve may serve as a relief valve.

Inwardly of the collar 190, and rising from bulge 192, is a further bulge 206 integral with the end housing which has a central recess 210 to receive a pump rotor mount in the form of a stub shaft 220. A view of the inside of the inlet end 120 is found in FIG. 6. Outside the pin recess 210 is an arcuate inlet port 222 open, as shown in FIG. 3, to the interior of inlet collar 190. Two diametrically opposed threaded holes 224 are formed on the inner face of housing 20 (FIG. 6). On the opposite side of center from the arcuate inlet opening is an outlet port 230 (FIG. 6) connected to previously referenced short passage 204. Relief valve passage 196 described in connection with FIG. 3 also is shown in FIG. 6. A shallow circular recess 234 surrounds pin shaft recess 210. Outlet port 230 has a short circumferential span as shown in FIG. 6 and this is positioned near the end of the compression area of the pump. Thus, any vapor in the pump will have been compressed into liquid state at this stage.

Cam ring 122, previously identified in FIGS. 3 and 4, has partial ring portions 124 which interfit with flux ring 126. This cam ring also has openings for headed retainer screws 240. These screw openings 242 are preferably larger than the screws to allow diametrical adjustment of the cam ring relative to the axis of the assembly. FIG. 4 shows cam ring 122. Triangular washer plates 244 underlie the heads of bolts 240 to apply retention pressure on the cam ring and hold it securely against the end housing 120. These plates also retain the outer gear rotor during assembly.

The cam ring 122 has a large circular opening 250 which is positioned off center from the basic axis of rotation and this opening receives the outer gear rotor 252 of a gear rotor pump. This particular outer gear rotor has, as an example eleven tooth recesses. The inner gear 254 of the gear rotor assembly is mounted on stub shaft 220 and has ten gear teeth formed thereon. The gear 254 has axial holes 255 spaced around the center shaft pin 220 to receive the finger projections 144 on drive projection 142. Some small clearance is provided between the finger projections 144 and the holes 255 in rotor 254 to provide for slight misalignment.

Pressed against the gear rotor assembly is a circular flat plate 260 preferably formed of flexible material. This plate is most effective if it is flexible. A thickness range of 0.005 to 0.020", depending upon material used, has proved satisfactory. The material from which the plate 260 is formed is preferably thin metal and more particularly stainless steel but some dense plastics or glass fiber fabrics may perform successfully. The circular plate is held firmly against and rotates with the rotor assembly, thereby forming a good seal and eliminating any axial clearance and at the same time causing very little friction. Behind this plate 260 is a multi-legged spider spring 262 (FIGS. 7 and 8) having five legs 264 bent, as shown in FIG. 8, in an axial direction from a center ring portion 263. The ends of the legs 264 are bent into a plane substantially parallel to the body portion 263 to form pressure pads 266. As shown in FIG. 3, the legs of the star or spider spring 262 interfit with the projections 144 and are pressed against the plate 260 when the parts are brought into assembly. There is a slight clearance between the diameter of the stub shaft pin and the inside diameter of the plastic drive sleeve 142 to allow some angularity to exist between the armature shaft and stationary rotor pin to prevent binding if there is slight misalignment.

A reinforcing plate 270 shown in FIG. 10 has a central hole 272 with spaced holes 274 to accommodate the projections 144. The periphery of plate 270 has ten radial fingers 276. This plate lies between disc 260 and the spider spring 262 so the fingers reinforce the edge of disc 260.

The shaft pin 220 is placed in recess 210 perpendicular to the surface 137 of the end housing against which the outer gear rotor 252 and the inner gear rotor 254 are pressed by the spider spring 262. Thus, in essence, there is a cantilever mount on shaft 220 for the inner gear rotor 254. The outer gear rotor 252 is supported by and rotatable in the cam ring 122.

The cylindrical drive projection 142, previously referenced as mounted on the armature assembly, has a central bore 145 which receives and is supported on the distal end of the stub shaft 220. There is some diametrical clearance between the bore 145 and the shaft 220 so that the drive projection 142 is rotatably piloted on the shaft but allows some play. This, coupled with the clearance between drive pins 144 and drive holes in rotor 254, compensate for any misalignment of the armature assembly relative to the stub shaft. As previously indicated, some clearance is provided between the drive fingers 144 and the holes 255 to allow for any slight misalignment. The seal plate 260, which may be made of a thin noncorrosive metal or a dense plastic, is sufficiently flexible that it will provide an adequate seal on the parts and this avoids the necessity for a very accurately machined and positioned housing plate at this side of the rotor. It also eliminates difficult tolerances on the cam ring 122 and gear rotors. The operating clearance needed between rigid parts is also eliminated and this reduces leakage and cost of manufacturing.

The seal plate 260 is illustrated in elevation in FIG. 9. This plate has a central opening 261 to accommodate the shaft 220 surrounded by openings 270 to accommodate the finger projections 144.

IN OPERATION, fluid supply through collar 190 enters the inlet port 222 and moves into gear recesses between the inner and outer gear rotors 252 and 254. As gear rotor parts 252 and 254 rotate, driven by the armature 140, the drive element 142, and fingers 144, liquid is placed under a pressure as the teeth of the rotor 254 move into the gear recesses of the gear rotor 252. Fluid, such as gasoline, is forced into the outlet ports 230 (FIGS. 3 and 6) and passes around the outer gear rotor 252 into the armature chamber and to the outlet housing port 164.

There is some outside clearance between cam ring 122 and shell 136 so the ring can be shifted relative to the headed screws 240 before they are tightened. There must be some clearance between the teeth of the inner rotor gear and those of the outer rotor gear at a point directly across from the area where the teeth are in mesh. This clearance would normally be in a range of 0.0005 to 0.003 inches. The clearance can be adjusted by movement of the cam ring which pilots the outer rotor gear. The object is to keep the teeth tip clearance to a minimum to prevent pressurized fluid from leaking across from the pressure side to the inlet side of the pumping unit. Once this is established, the screws 240 are tightened and the parts will maintain the proper relationship.

In this embodiment in FIGS. 3 to 10, the same function of noise reduction is accomplished by the flexible disc 260 as by the fingers 104, 106 and 108 in FIGS. 1 and 2. Should there be cavitation (vapor) in the pump at the outlet side, the flexible disc 260 would prevent outlet pressure from shooting back into the pump cavities. When solid fuel is being pumped, the periphery of disc 260 flexes to egress the fuel to the outlet ports. However, the disc 260 forms a barrier, as do the reed valves of FIGS. 1 and 2, preventing the outlet pressure from reaching pump chambers which may contain vapor rather than solid fuel. Thus, there is a significant reduction in noise as the pump operates particularly in warm weather. If desired flexing disc 260 could be utilizted on the gear rotor pump assembly of FIG. 3 on the other side of the inner and outer gear rotors, but this disc would not rotate with the rotors. In this case, the recessed area 230 would be extended as shown in dotted lines in FIG. 6.

Thus, in each of the embodiments shown in FIGS. 1 and 3, a pump rotor combination operates with expanding and ensmalling pumping chambers. In each, there is a circumferential inlet area and a circumferential outlet area spaced circumferentially from each other. The ensmalling chambers in the outlet area are blocked on one side of the rotor combination, and, at the other side of the rotor, are closed by biased means which will flex to allow liquid egress in the inlet area. This biased means prevents backflow of the outlet pressure into a pumping chamber which may be vapor filled rather than liquid filled. This has been found to significantly reduce the noise of an operating pump. Since, when these pumps are used for fuel in a passageway vehicle, they are frequently mounted within a fuel tank, the noise factor is important to the comfort of passengers. In areas where the ambient heat is high, the vaporization of volatile fuel will cause what is termed as "cavitation" in the pump. The present invention is directed to minimizing the noise normally caused by cavitation.

What is claimed is:

1. In a rotary pump for pumping liquid,
   (a) a rotor combination utilizing circumferentially disposed expanding and ensmalling, positive-displacement, pumping chambers,
   (b) a first circumferentially reduced pressure inlet area on said rotor combination,
   (c) a second circumferentially increased pressure outlet area on said rotor combination spaced circumferentially from said first area,
   (d) a first means on one side of said rotor combination comprising an inlet housing having an inlet opening at one portion and a face plate at another portion lying directly adjacent said rotor combination, said face plate having a passage and connected ports communicating with said inlet opening and with said first circumferential reduced pressure inlet area of said rotor combination, said face plate having also an outlet port facing said rotors in the second circumferential area,
   (e) outlet housing means forming an outlet chamber on the side of said rotors opposite said inlet housing to receive outlet pressure from said outlet port,
   (f) second means closing said pumping chambers on the other side of said rotor combination comprising a flexible, resilient, sealing disc having one surface lying directly against said rotors and having a flexible peripheral margin terminating outside said pumping chambers, said margin being free to move away from said rotors, and
   (g) power means to rotate said rotors and said disc simultaneously,
   (h) said disc on the surface opposite said rotors being open to said outlet chamber and the pressure in said outlet chamber whereby when pressure develops in the pumping chambers in said second circumferential area above the pressure in said outlet chamber, the periphery of said disc will flex to admit pumping fluid to said outlet chamber.

2. A rotary pump as defined in claim 1 in which a reinforcing plate is positioned adjacent said sealing disc on the outlet chamber side of said disc having radial fingers to resiliently bias the peripheral edge of said disc against rotors at circumferentially spaced points around the disc.

3. A rotary pump as defined in claim 2 in which a spider spring is positioned against said reinforcing plate on the outlet chamber side of said plate and means on said power means to press said spider spring against said resiliently biasing plate, said plate and said spider spring rotating with said power means, said disc and said rotors.

* * * * *